(12) United States Patent
Wallace (10) Patent No.: US 11,905,689 B2
(45) Date of Patent: Feb. 20, 2024

(54) DEVICE, SYSTEM AND METHOD FOR LEAK DETECTION AND CONTROL

(71) Applicant: RK Industries, LLC, Denver, CO (US)

(72) Inventor: Matthew Wallace, Aurora, CO (US)

(73) Assignee: RK INDUSTRIES, LLC, Denver, CO (US)

( * ) Notice: Subject to any disclaimer, the term of this patent is extended or adjusted under 35 U.S.C. 154(b) by 372 days.

(21) Appl. No.: 17/502,903

(22) Filed: Oct. 15, 2021

(65) Prior Publication Data

US 2023/0124088 A1    Apr. 20, 2023

(51) Int. Cl.
   *E03B 7/07*    (2006.01)
   *G01M 3/28*    (2006.01)
   *E03B 7/08*    (2006.01)

(52) U.S. Cl.
   CPC .............. *E03B 7/071* (2013.01); *E03B 7/08* (2013.01); *G01M 3/2815* (2013.01)

(58) Field of Classification Search
   CPC ......... E03B 7/08; E03B 7/071; G01M 3/2815
   See application file for complete search history.

(56) References Cited

U.S. PATENT DOCUMENTS

| | | | |
|---|---|---|---|
| 5,010,761 A | | 4/1991 | Cohen et al. |
| 5,614,825 A | | 3/1997 | Maxfield et al. |
| 9,383,289 B1 | | 7/2016 | Meyer |
| 2003/0098074 A1 | | 5/2003 | Kayahara et al. |
| 2006/0272830 A1* | | 12/2006 | Fima ..................... F24H 15/212 169/16 |
| 2010/0212748 A1 | | 8/2010 | Davidoff |
| 2013/0263794 A1 | | 10/2013 | Knurr et al. |
| 2016/0349140 A1* | | 12/2016 | Teymouri ............ G01M 3/2807 |
| 2017/0030528 A1* | | 2/2017 | Dietzen ..................... F17D 5/06 |
| 2018/0291911 A1* | | 10/2018 | Ward ......................... F04F 5/10 |
| 2019/0063689 A1 | | 2/2019 | Liu et al. |
| 2019/0281371 A1 | | 9/2019 | Klicpera |
| 2019/0377369 A1 | | 12/2019 | Evans |
| 2021/0018393 A1* | | 1/2021 | Downey ................. E03B 7/071 |

OTHER PUBLICATIONS

International Search Report and Written Opinion in International Application No. PCT/US22/81576 dated Mar. 8, 2023, 16 pages.

* cited by examiner

*Primary Examiner* — Mohammad Ali
*Assistant Examiner* — Vincent W Chang
(74) *Attorney, Agent, or Firm* — Berg Hill Greenleaf Ruscitti LLP (57) ABSTRACT

A device of the invention comprises piping for carrying liquid such as potable water within a piping network of a building, at least two control valves, a pressure transducer to measure water pressure in the piping, a flowmeter to measure water flow and a controller to control opening and closing of the control valves based on sensed pressure and measured waterflow. The controller has a processor with preprogrammed instructions for controlling conditions under which the control valves are opened and closed by command from said controller. Two programmable modes for control are provided for use in a building under construction; a rough-in operation and a normal water-on operation. Both modes have respective leak prevention logic in the controller enabling automatic operation of the control valves for effective leak prevention. The device may be employed within a communications network in which remote computers and mobile communication devices may observe and/or control operation of the device.

13 Claims, 8 Drawing Sheets

DEVICE, SYSTEM AND METHOD FOR LEAK DETECTION AND CONTROL

FIELD OF THE INVENTION

The invention relates to systems and methods for preventing water damage within structures such as buildings, and more particularly, to a system and method especially adapted to prevent water damage to a building under construction by leak detection of potable water within a piping system of the building.

BACKGROUND OF THE INVENTION

During the construction of a building, whether residential or commercial, construction requires the installation of a potable water system. At any point in time during construction, there may be multiple contractors working on the building and at simultaneous or different times during construction hours. Once the water system is installed, it is common for there to be one or more leaks. An undiscovered leak may continue to flow for an extended duration. For example, such leaks can occur during off-hours, in parts of a partially constructed facility that does not have construction activities for a duration of time, or in parts of a facility that are not frequented for observation to enable inspection.

Regardless of the source of the leak, a relatively small amount of water leakage can result in extensive damage to the structure. Subsequent remediation takes time and often involves a very large insurance claim that can substantially slow or stop the construction process. Accordingly, what begins as a relatively minor water leak can result in a very expensive and time-consuming effort for remediation and recommencement of construction.

One example of a prior art leak detection system includes the invention disclosed in the U.S. Pat. No. 9,383,289. This invention teaches a water leak detection system for detecting water leaks in residential and commercial buildings. The system provides a central monitoring and point indication data of water leaks. The system includes a plurality of address modules connected to a plurality of sensors for assigning an identifier to each sensor. The address modules are in communication with a central control unit that processes detected sensor signals and provides an alarm condition with point identification of the water leak. The central control unit operates a valve associated with the sensor(s) which has detected the leak to shut off the water flow. The central control unit may communicate with remote equipment by a wired or wireless communications network.

Another reference that discloses a system for detecting fluid leaks is disclosed in the US Patent Publication No. 2010/0212748. The system includes the monitoring of rate of flow of a fluid flowing through a fluid distribution network over a period of time. A determination is made whether the rate of flow over the period of time is greater than zero but at a rate that indicates a possible leak in the piping of the system. If the rate of flow indicates the leak, then flow through the system is stopped and an alarm indication is provided that a leak has been detected. A leak occurrence is determined by a minimum legitimate flow rate.

Another reference that provides you a system for detecting fluid leaks in piping systems is disclosed in the US Patent Publication No. 2019/0063689. The reference discloses the use of the device comprising piping for transporting fluid, a shut off valve, a flowmeter, a pressure decay detector configured to measure the pressure change of the fluid in the piping, a valve, a flowmeter and a pressure decay detector that communicates with the controller. The control logic employs functionality for detection and measurement of at least two consecutive pressure decay tests. Detected pressure drops result in operation of the shut off valve to prevent flow. The invention also provides a method for detecting the presence of micro leaks in the piping.

Another reference that provides leak detection is taught in the US Patent Publication No. 2019/0377369. The reference provides for a leak detection assembly for sensing and stopping a water leak in a building. The assembly includes a sensing unit that is positioned near a pipe to be monitored. The sensing unit senses moisture thereby facilitating a signal sent to the assembly indicating a water leak if moisture is detected. A shut off unit is incorporated in the monitor type and is activated upon sensed moisture. To facilitate mounting of the sensing unit, a fastener is secured in proximity to the monitored pipe and the sensor is positioned within the fastener.

While the prior art may be adequate for its intended purposes, there is still a need for a device and method that can be easily deployed within a building under construction. A building under construction may not have a dedicated space or mounting area where a detection system can be installed. Further, the building may not have power or the building may not have a consistent source of power during certain times. Yet further, various areas of a building may not be accessible due to the needs for finishing the building in which various contractors may need to have exclusive access to such areas. Considering these factors, the prior art generally fails to provide a solution that is mobile and that can be employed at various locations within the building at any time.

Another general shortcoming of the prior art is that many such systems are overly complex, require excessive set-up or calibration, or cannot be easily deployed in partially constructed buildings.

The description of the invention that follows overcomes the above-mentioned shortcomings of the prior art and provides other features and advantages that will become apparent from a review of the following description and drawings.

SUMMARY OF THE INVENTION

The invention, according to one preferred embodiment, is a leak detection and control device capable of being manually or automatically controlled and easily installed in the water piping network or system of a building undergoing construction. Components of the device include one or more primary control valves that control water flow into the building and to allow drainage of water if a leak is detected. Other components include a controller that receives inputs that convey the status of fluid pressure and water flow within the piping of the building, output control components used to open and close the control valves and to otherwise restrict or permit water flow through the water piping of the building in which the device is installed.

According to another preferred embodiment of the invention, the leak detection device may be monitored and controlled through a communications network in which mobile communication devices and remote workstations can be used to monitor the status of the system and to execute commands for control of the system. This embodiment therefore also includes a plurality of user interfaces for a user to monitor and to execute commands for control of the leak detection device. When incorporated within a communications network, the device may be regarded as a system.

According to another preferred embodiment of the invention, it includes a method of controlling water flow through piping of a structure such as a building in which the control may be achieved either manually or remotely. Various parameters of pressure and water flow within the piping of the building are monitored for early detection and control of leaks.

According to yet another preferred embodiment, the invention may be considered a mobile leak detection device or system in which the device/system is self-contained and may be easily transported from one job site to another. The components are mounted on a frame or carriage and the only installation requirements are to make a piping connection to an incoming water source, a piping connection to the main water pipe of the building, and a piping connection to a drain to carry away water if a leak is detected.

The various embodiments of the invention are capable of detecting water leaks at an early stage and to then interrupt the flow of water to the building at the incoming source. Further, the embodiments are capable of relieving pressurized water in the piping of the building to prevent water from continuing to leak as the potential energy of the pressurized water poses a continuing threat of water damage until pressurized water is relieved and drained.

Within the construction process of a building, the invention addresses two distinct phases of the construction. A first phase of construction is characterized by the requirement to utilize the building's domestic water service for construction related activities. These activities include masonry work, building cleaning and treatment of materials and pipe testing. The first phase often utilizes portions of the permanent piping of the building. A best construction practice during this initial phase of construction is to shut off the domestic water source during off-hours or when construction related activities require access to the piping or such activities may otherwise interfere with operation of the piping. Only discontinuing the domestic water source, such as shutting off a valve at the incoming main water pipe, does not relieve the pressurized water within the building piping. The first phase may also be referred to herein as the "rough in" operation as the first phase relates to operation of the device of the invention. A second phase of construction is characterized by the progress of the construction to the point when domestic water must remain on within the building. At this point, plumbing fixtures have been installed and the entire piping system of the building must be monitored for leaks. If there is a leak in the building at this phase, domestic water service to the building requires interruption and any potential energy of the stored water within pipes must be relieved to prevent flooding and damage. The second phase may also be referred to herein as the normal "water on" operation as the second phase relates to operation of the device of the invention.

During each of the phases of construction, pressure and flow within the piping are variable. In order to prevent inadvertent pipe control valve operation and draining of water within the pipes, the controller must have predetermined parameters set for pressure and flow that enable the control to best predict when an actual leak has occurred as opposed to fluctuations in flow and pressure that may be a result of work being conducted on the piping system of the building.

Accordingly, during the phases of construction, specific water flow and pressure parameters must be monitored to determine when a leak has occurred. These parameters change over the course of construction. Therefore, as mentioned, there must be predetermined parameters as to what constitutes an actionable leak and to distinguish leaks from permissible changes in water pressure and flow rate of water within the piping.

Considering the foregoing features of the invention, in one aspect, it may be considered a leak detection and control device comprising: piping for carrying water; a first control valve mounted in said piping for receiving water from a water source (such as a domestic water supply); a second control valve mounted in said piping located downstream from said first control valve and receiving water from said first control valve; a pressure transducer communicating with said piping to measure water pressure therein; a flowmeter communicating with said piping to measure water flow therein; a controller to control opening and closing of said first and second control valves, said controller having a processor, a data storage element, and preprogrammed processor instructions for controlling conditions under which said first and second control valves are opened and closed by command from said controller; said first and second control valves being opened and closed based upon measured changes of pressure and water flow within said piping; and wherein said preprogrammed processor instructions include a first phase construction mode of operation in which a measured pressure drop in the piping indicates a leak and at least said second control valve is operated to prevent flow into the piping and water in the piping is directed to a drain, said processor instructions further including a second phase construction mode of operation in which a measured pressure drop or a measured amount of flow in the piping indicates a leak and at least said second control valve is operated to prevent flow into the piping and water in the piping is directed to the drain.

In another aspect of the invention, it may be considered a leak detection and control system comprising: a leak detection and control device including piping for carrying water; a first control valve mounted in said piping for receiving water from a water source; a second control valve mounted in said piping located downstream from said first control valve and receiving water from said first control valve; a pressure transducer communicating with said piping to measure water pressure therein; a flowmeter communicating with said piping to measure water flow therein; a controller to control opening and closing of said first and second control valves, said controller having a processor, a data storage element, and preprogrammed processor instructions for controlling conditions under which said first and second control valves are opened and closed by command from said controller, said first and second control valves being operated by instructions received from said processor considering measured changes of pressure and water flow within said piping, and wherein said processor instructions include a first construction mode of operation, and wherein said processor instructions include a second construction mode of operation including a normal water-on operation; a software application communicating with said leak prevention device to receive data, display data, and to selectively transfer data to one or more remote computing or mobile communication devices, said software application comprising a plurality of user interfaces for displaying data associated with water conditions within said piping, said water conditions including flowrate of the water, pressure of the water and a status of said device responsive to said conditions; and a first user interface showing data associated with said first and second construction modes of operation.

In another aspect of the invention, it may be considered a mobile leak detection and control device comprising: a carriage including a plurality of frame members, a panel and piping mounts; device piping for carrying water and said device piping secured to said frame members by said piping mounts; a first control valve mounted in said device piping for receiving water from a water source; a second control valve mounted in said device piping located downstream from said first control valve and receiving water from said first control valve; a pressure transducer communicating with said device piping to measure water pressure therein; a flowmeter communicating with said device piping to measure water flow therein; a controller to control opening and closing of said first and second control valves, said controller having a processor, a data storage element, and preprogrammed processor instructions for controlling conditions under which said first and second control valves are opened and closed by command from said controller; and said first and second control valves being opened and closed based upon measured changes of pressure or water flow within said device piping.

In yet another aspect of the invention, it may be considered a method for leak detection of water within piping and to control water flowing through the piping to prevent water damage in the event of a detected leak, said method comprising: providing piping for carrying water; providing a leak detection and control device comprising: a first control valve mounted in said piping for receiving water from a water source; a second control valve mounted in said piping located downstream from said first control valve and receiving water from said first control valve; a pressure transducer communicating with said piping to measure water pressure therein; a flowmeter communicating with said piping to measure water flow therein; a controller to control opening and closing of said first and second control valves, said controller having a processor, a data storage element, and preprogrammed processor instructions for controlling conditions under which said first and second control valves are opened and closed by command from said controller; monitoring a status of water in the piping wherein said first and second control valves are opened and closed based upon measured changes of pressure and water flow within said piping; executing processor instructions of said controller including a first phase construction mode of operation in which a measured pressure drop in the piping indicates a leak and said second control valve is operated to prevent flow into the piping and water in the piping is directed to a drain; and executing processor instructions of said controller including a second phase construction mode of operation in which a measured pressure drop or a measured amount of flow in the piping indicates a leak and said second control valve is operated to prevent flow into the piping and water in the piping is directed to the drain.

Optional features of the method for leak detection may include: providing a carriage to support said device, said carriage including a plurality of frame members, a panel for mounting of selected elements of said device including said controller and said pressure transducer, and wheels mounted to said carriage; providing a switch communicating with said controller for selectively placing the device in a selected mode of operation; wherein the piping for carrying water is mounted to said carriage, said piping is subsequently connected to existing piping in a building in which leak detection is required when said device is installed in the building for use; and wherein said device with said piping of said device mounted on said carriage is disconnected from said existing piping in said building and moved to another location for subsequent installation at another location.

Other features and advantages of the invention will become apparent from the following detailed description taken in conjunction with the accompanying drawings.

DETAILED DESCRIPTION

Figure 1:
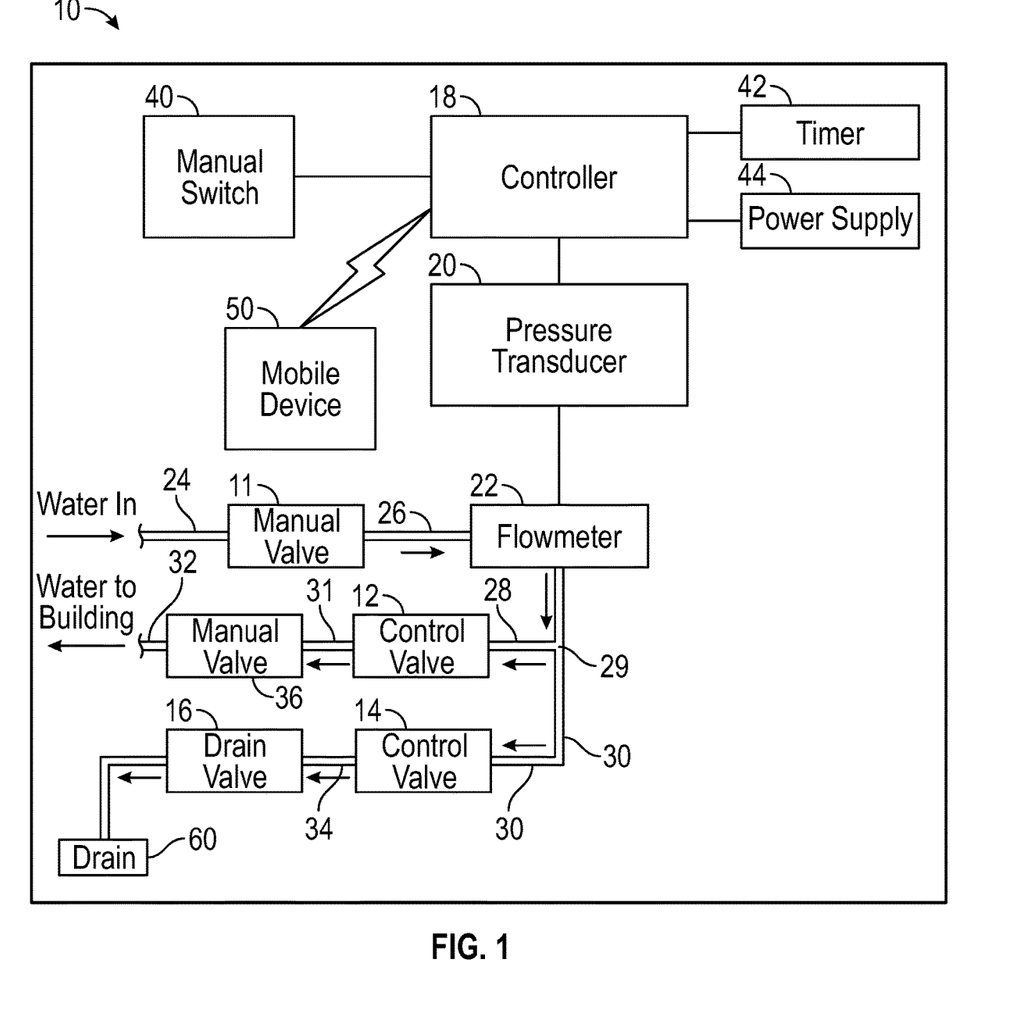
FIG. 1 is a simplified schematic diagram of the device of the invention in one preferred embodiment.

Referring first to FIG. 1, a simplified schematic diagram is provided for one preferred embodiment of the invention. A leak detection and control device 10 is shown with a plurality of fluid carrying elements such as piping. Also shown are a plurality of valves used to control water coming into a structure such as a building and to control routing of the water in the piping to a drain, in the event of a detected leak. Water comes into the building through a municipal water source and through pipe 24. An optional manual isolation valve 11 receives the flow of water through the pipe 24. An intermediate pipe section 26 interconnects the downstream end of isolation valve 11 with a flowmeter 22. Downstream from the flowmeter 22 are two pipe sections 28 and 30, and a T connection 29 located at the intersection of the pipes 28 and 30. Pipe 28 carries water to a first control valve 12. Water is carried downstream from the first control valve 12 through pipe 31 to another optional manual isolation valve 36 and then downstream to the building through pipe 32. Pipe 30 carries water to a second control valve 14. The downstream side of the control valve 14 is connected to drain line 34 which carries water to another optional manual valve, drain valve 16. Drain valve 16 connects downstream with drain 60.

Operation of the control valves 12 and 14 is carried out by controller 18. Although valves 11, 16 and 36 are described as manually operated valves, these valves according to another embodiment of the invention could be operated by the controller 18.

The controller 18 can take many forms to include a microprocessor, a programmable logic controller (PLC) and others. The controller runs one or more computer programs such as software, firmware, or combinations thereof. The computer programs function to monitor the status of water within the piping of the device and to enable outputs from the controller for opening and closing of the control valves 12 and 14.

Also illustrated is a pressure transducer 20 which is used to monitor pressure within the piping. The pressure transducer is shown as communicating with the flow meter 22 which may be a convenient way of measuring water pressure by water that flows through the flowmeter 22; however, it should be understood that the pressure transducer 20 can be connected to any one of the pipes of the device in order to monitor water pressure at any point as water flows through the device. A manual switch 40 is also illustrated which may be used to place the device in either the "rough-in" mode of operation or the normal "water-on" mode of operation. The switch 40 can also be used to disable the device if placed in the off position.

During certain circumstances, it may be desirable to prevent automatic control, such as when preprogrammed instructions in the software would otherwise cause the valves 12 and 14 to be operated and the override is therefore used to prevent automatic control of the valves. A timer 42 is shown as communicating with the controller, the purpose of the timer being to set certain timing parameters for executing instructions from the controller or to provide another manual override function for timing control of the device. A power supply 44 provides power to the device. The power supply can be, for example, a 120-volt AC to 24-volt AC transformer. A battery backup (not shown) can also be provided. The battery backup may be desirable in building construction since electrical power may periodically be discontinued, meanwhile pressurized water could remain within the piping system of the building which requires some control. Therefore, the device can maintain control of water flow even during loss of power events within the building.

Figure 2:
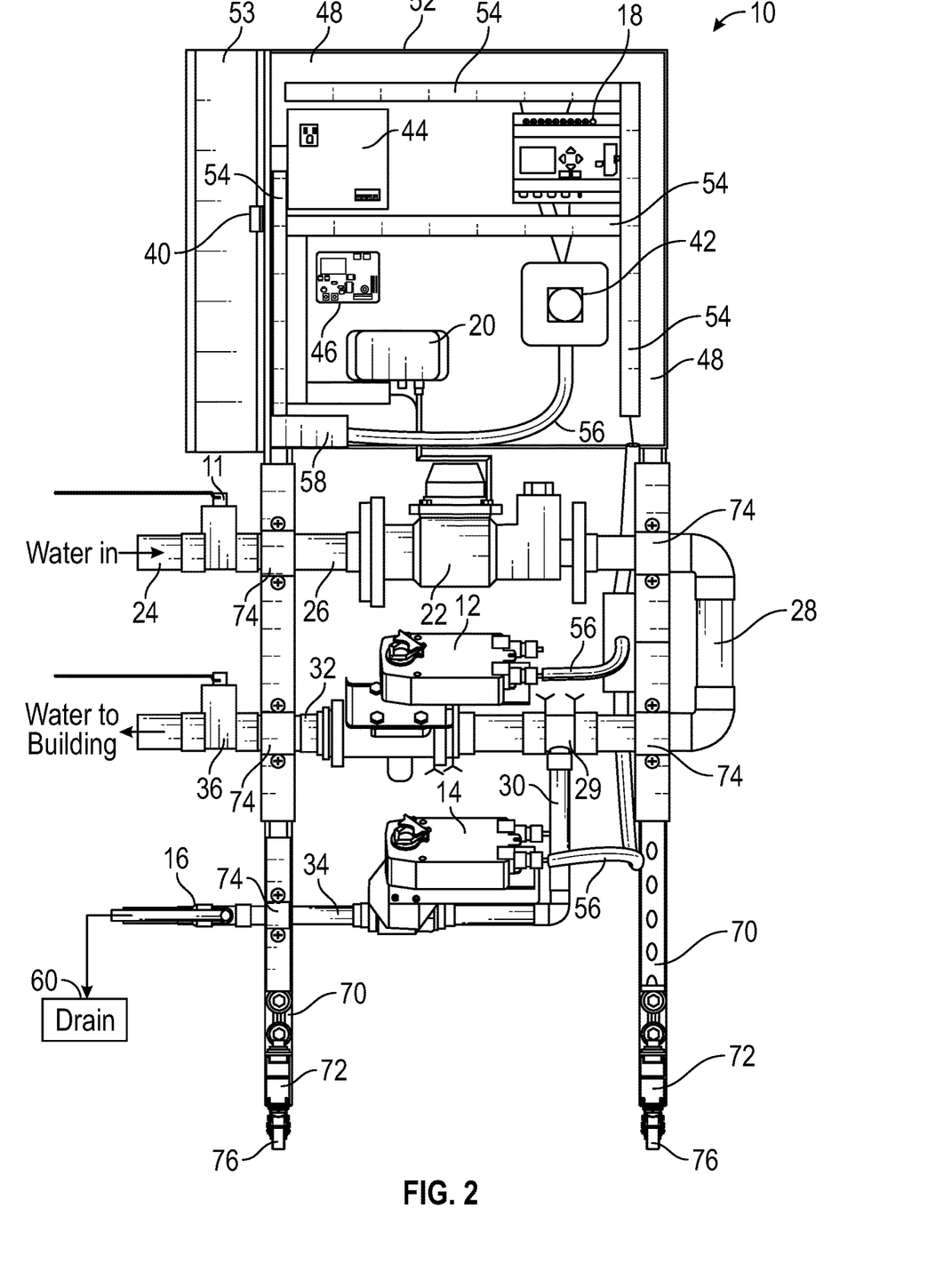
FIG. 2 is an enlarged front elevation view of another preferred embodiment of the device.
Figure 3:
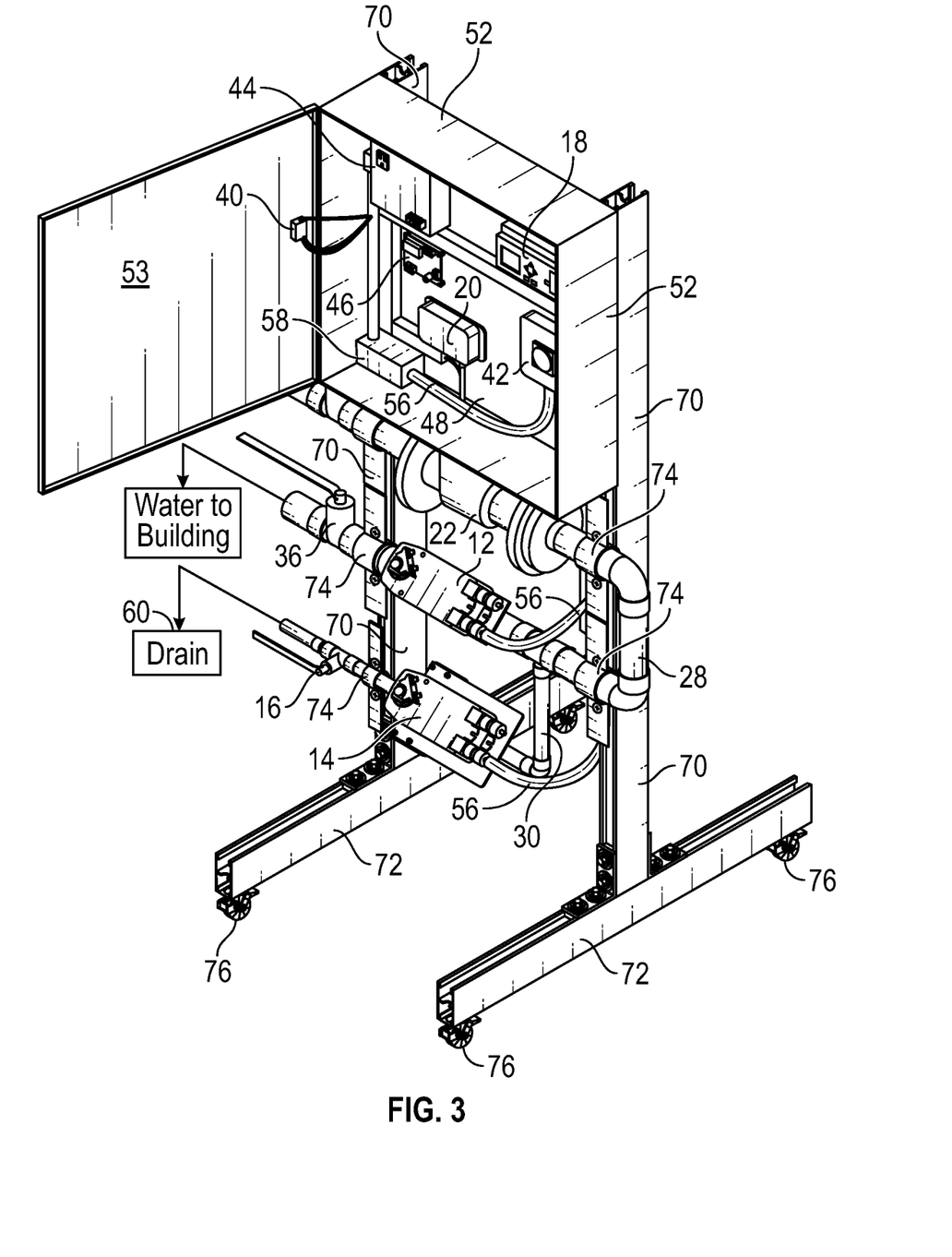
FIG. 3 is a perspective view of the preferred embodiment of FIG. 2.

FIG. 2 is an enlarged front elevation view of another preferred embodiment of the device 10. FIG. 3 is a perspective view of the preferred embodiment of FIG. 2. Referring to these two figures, this embodiment can be characterized as a mobile device that is easily transported between job sites. Mobility is provided by a movable carriage assembly that provides a mounting structure for each of the components of the device.

A panel or housing 52 provides a protected enclosure for mounting the electrical and electronic components of the device 10. The panel 52 may be, for example, an electrical power distribution panel that conforms to the appropriate safety and performance standards for power distribution panels used in commercial or residential buildings. The panel door 53 is shown open enabling a user to view the components mounted within the panel. The manual switch 40 is shown as mounted to the door of the panel. The panel 52 has one or more wireways 54 to bundle and protect device wiring. All or selected electrical and electronic components of the device may be housed. As shown, these components may include an AC power supply 44, a DC power supply 46, the controller 18, the pressure transducer 20, and the timer 42. Further illustrated within the panel is a junction box 58 and shielded electrical conduit 56 for carrying control wires to and from the controller 18. As also illustrated, shielded electrical conduit 56 may also be used for carrying the control wires to their respective control valves 12 and 14.

The particular piping arrangement shown in FIG. 2 slightly differs from the embodiment of FIG. 1 in that the flowmeter 22 is located upstream of the first control valve 12. This alternate piping arrangement however does not alter the basic functioning of the control valves 12 and 14 and this piping arrangement simply being exemplary of how the flowmeter may be installed at different locations within the piping of the device 10.

The carriage assembly includes a pair of vertical frame members 70 and a corresponding pair of horizontal frame members 72. The panel 52 is mounted to the upper portion of the vertical frame members 70. The horizontal frame members 72 provide a platform for which the mounted panel 52 and components are made moveable, such as by wheels 76 mounted to the horizontal frame members 72.

Optionally, the device 10 may include an inlet isolation valve 11 located upstream of the flowmeter 22 as well as a building isolation valve 36 located downstream from the control valve 14. These isolation valves can be operated to prevent water flow through the device so the control valves 12 and 14 or the flowmeter 22 can be disconnected for repair or replacement. These valves 11 and 36 are depicted as manual valves with corresponding handles, but it should be understood that these valves could also be incorporated as control valves that communicate with and controlled by the controller 18.

FIGS. 2 and 3 also illustrate the piping components, the group of valves and flowmeter 22 each being mounted to the vertical frame members 70. The sections of piping between the control valves 12 and 14 and the piping interconnecting the flowmeter 22 to the control valve 12 are secured to the vertical members 70 as by brackets 74. The vertically extending frame members 70 allow each of the valves and the flowmeter 22 to be conveniently stacked for easy viewing and for a compact and accessible arrangement. Accordingly, a user standing in front of the device is capable of viewing all of the device components for any necessary maintenance, troubleshooting or adjustments.

Figure 4:
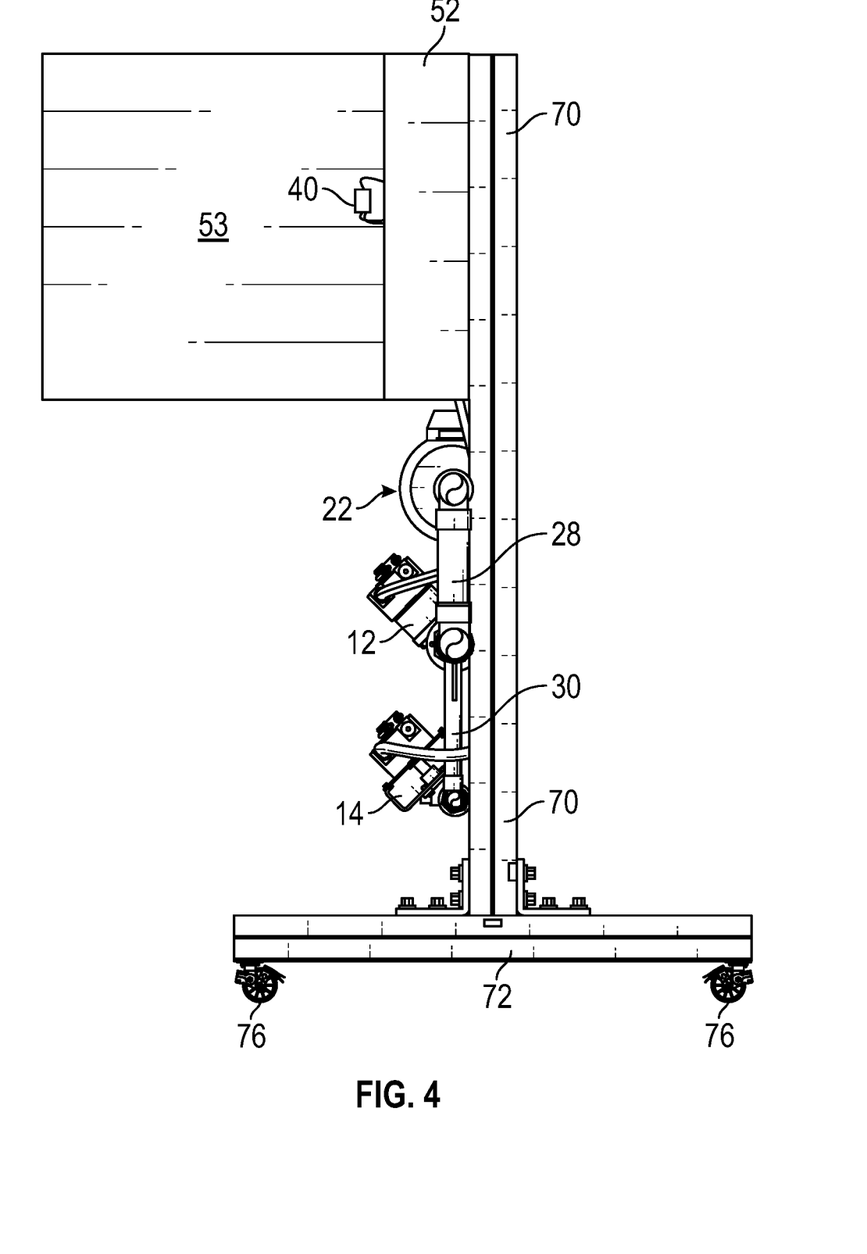
FIG. 4 is a side elevation view of the preferred embodiment of FIG. 2.

FIG. 4 is a side elevation view of the preferred embodiment of FIG. 2. This side elevation view emphasizes the compact arrangement of the device that enables it to be moved and installed in very small spaces.

Figure 5:
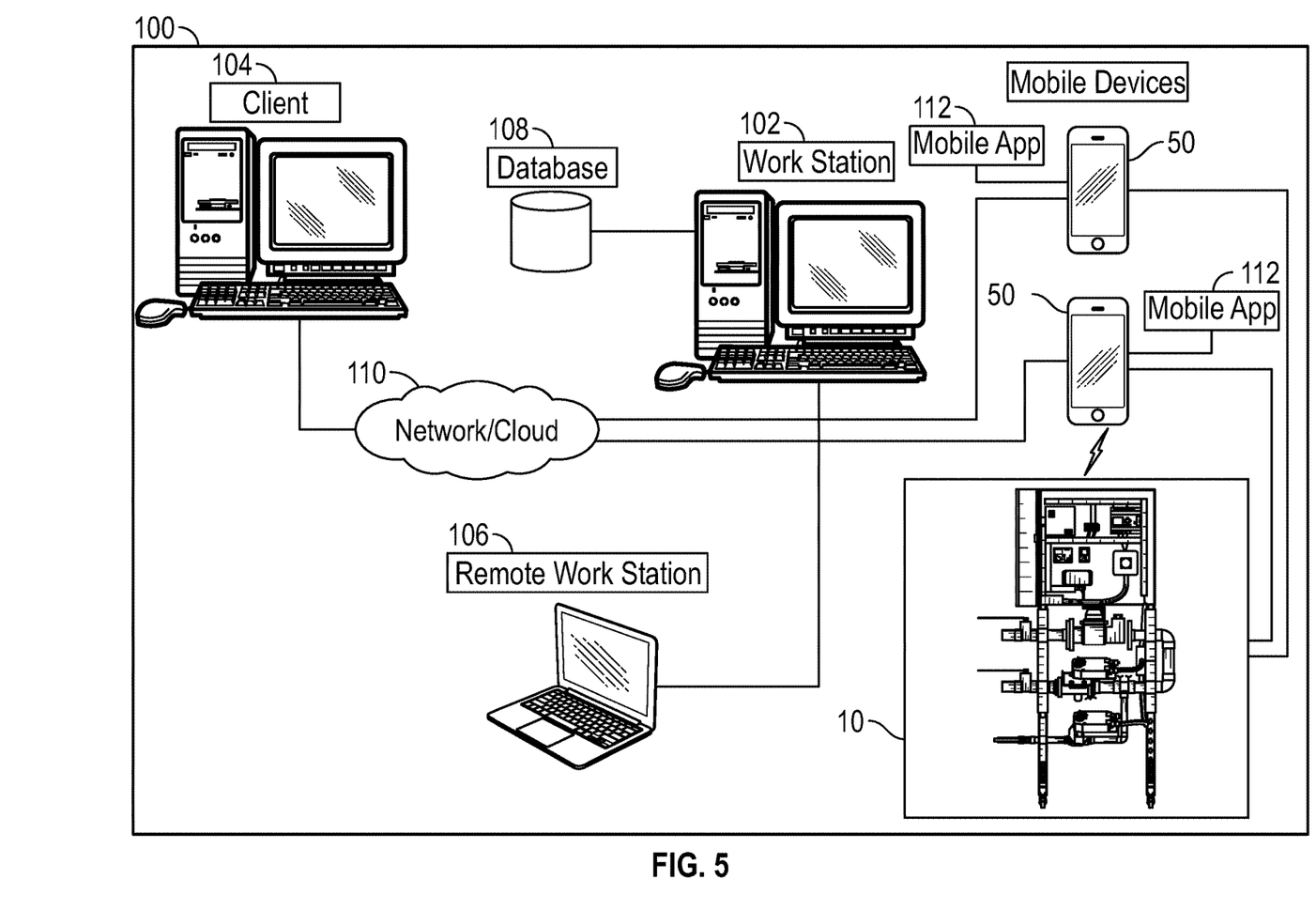
FIG. 5 is a schematic diagram of a system of the invention.

FIG. 5 is a schematic diagram of a system 100 of the invention. The system 100 defines an exemplary computer processing and communication network that may be used in connection with the device. More specifically, FIG. 5 illustrates a schematic diagram of the system that includes one or more user computers shown as workstation 102, remote workstation 106, and a client/customer computer 104. Each of the depicted computers 102, 104 and 106 may alternatively comprise more than one computer.

FIG. 5 also schematically illustrates the device of the invention 10. The device 10 may have its own wireless transmitter/receiver (not shown) that is capable of wireless communications with one or more mobile communication devices 50. Alternatively, the workstations 102 and 106 could incorporate wireless communication capabilities so that wireless communications take place between one or more workstations and the mobile devices 50.

Although only one device 10 is illustrated in FIG. 5, it should be understood that the system 100 is intended to accommodate employment of multiple devices 10 at one or more installed locations.

Each of the mobile communication devices 50 may operate to run their own mobile application or "app" to process data received from device 10 and to generate user options for a user of the app. The devices 50 communicate with a communications network 110 such as by a web interface. The network 110 may also represent a cloud provider who facilitates communication with any or all communication endpoints shown in the system 100. The mobile devices 50 may also communicate with any other of the computers in the system through the network 110.

The mobile devices have their own internal computer processing capabilities with integral computer processors and other supporting hardware and software. The mobile devices may be specially configured to run mobile software applications in order to view user interfaces and to view and update system data. All of the functionality associated with the system as applied to the computers 102, 104, and 106 may be incorporated in the mobile devices 50 as modified by mobile software applications especially adapted for the mobile device hardware and operating systems. In connection with operating systems, it should therefore be understood that the mobile devices 50 are not limited to any particular operating system, Apple iOS and Android-based systems being but two examples.

Although FIG. 5 illustrates the use of workstations 102, 104, a client computer 104 and mobile communication devices 50, a simplified communications network according to another preferred embodiment of the invention only includes mobile communication devices for monitoring and control of one or more devices 10. In recent years, mobile apps have become a cost effective and efficient way for providing remote control of complex mechanical/electrical systems. All of the functionality associated with installation of the device(s), operation, troubleshooting and alarm management may be handled through a mobile app installed on mobile communication devices.

The workstation computer 102 represents one or more computers used at the jobsite to monitor the device 10 and to generate user interfaces for a user to view and control device operation. The remote workstation computer 106 represents one or more computers used to remotely monitor the device 10 and to generate user interfaces, thus having the same functionality as workstation 102 but the computer 106 being located remote from the jobsite. The client/customer computer 104 represents one or more computers of third parties, such as clients, who may wish to view operation of the device view the status of any leaks detected, and to generate correspondence with system users to instruct desired actions to be taken in connection with detected leaks. The client/customer computer 104 has limited system functionality in that it cannot be used to generate operation commands for control of the device, this functionality being reserved for authorized system users such as general contractors or building owner representatives.

The user computers 102, 104, and 106 may comprise general purpose personal computers (including, merely by way of example, personal computers and/or laptop computers running various versions of Microsoft's Windows® and/or Apple® operating systems) and/or workstation computers running any of a variety of commercially-available LINUX®, UNIX® or LINUX®-like operating systems. These user computers 102, 104, and 106 may also have any of a variety of applications, including for example, database client and/or server applications, and web browser applications. Alternatively, the user computers 102, 104, and 106 may be any other electronic device, such as a thin-client computer, Internet-enabled mobile telephone, and/or personal digital assistant, capable of communicating via a network and/or displaying and navigating web pages or other types of electronic documents.

The system network 110 may be any type of network familiar to those skilled in the art that can support data communications using any of a variety of commercially-available protocols, including without limitation TCP/IP, SNA, IPX, AppleTalk®, and the like. Merely by way of example, the communications network 110 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The workstation computer 102 may alternatively represent a server computer. One type of server may include a web server used to process requests for web pages or other electronic documents from the mobile devices 50 and computers 104 and 106. The web server can be running an operating system including any of those discussed above, as well as any commercially-available server operating systems. The web server can also run a variety of server applications, including HTTP servers, FTP servers, CGI servers, database servers, Java servers, and the like. In some instances, the web server may publish operations available as one or more web services.

The system 100 may also include one or more file and/or application servers, which can, in addition to an operating system, include one or more applications accessible by a client running on one or more of the user computers mobile devices 50 and computers 102 and 106. The file/application server(s) may be one or more general purpose computers capable of executing programs or scripts in response to the mobile devices 50 and user computers 102 and 106. As one example, the server may execute one or more web applications. The web application may be implemented as one or more scripts or programs written in any programming language, such as Java®, C, C #™ or C++, and/or any scripting language, such as Perl, Python, or TCL, as well as combinations of any programming/scripting languages. The application server(s) may also include database servers, including without limitation those commercially available from Oracle®, Microsoft, Sybase®, IBM® and the like, which can process requests from database clients running on a user computer.

The system 100 may also include a database 108 for storing all data associated with running the apps from mobile devices 50 and running any other computer programs associated with user interfaces provided to a user regarding the functions relating to operation and control of the device 10. The database 108, although shown being co-located with the workstation 102, may reside in a variety of different locations. By way of example, database 108 may reside on a storage medium local to (and/or resident in) one or more of the computers 102 and 106. Alternatively, it may be remote from any or all of the computers 102 and 106 and network 110, and in communication (e.g., via the network 110) with one or more of these. In a particular set of embodiments, the database 108 may reside in a storage-area network ("SAN"). Similarly, any necessary files for performing the functions attributed to the mobile devices 50 and computers 102, 104, and network 110 may be stored locally on the respective mobile device or computer and/or remotely, as appropriate. The database 108 may be a relational database, such as Oracle® database.

In accordance with any of the computers 102, 104, and 106, these may be generally described as general-purpose computers with elements that cooperate to achieve multiple functions normally associated with general purpose computers. For example, the hardware elements may include one or more central processing units (CPUs) for processing data. The computers 102, 104, and 106 may further include one or more input devices (e.g., a mouse, a keyboard, etc.); and one or more output devices (e.g., a display device, a printer, etc.). The computers may also include one or more storage devices. By way of example, storage device(s) may be disk drives, optical storage devices, solid-state storage device such as a random-access memory ("RAM") and/or a read-only memory ("ROM"), which can be programmable, flash-updateable and/or the like.

Each of the computers and servers described herein may include a computer-readable storage media reader; a communications peripheral (e.g., a modem, a network card (wireless or wired), an infra-red communication device, etc.); working memory, which may include RAM and ROM devices as described above. The server may also include a processing acceleration unit, which can include a DSP, a special-purpose processor and/or the like.

The computer-readable storage media reader can further be connected to a computer-readable storage medium, together (and, optionally, in combination with storage device(s)) comprehensively representing remote, local, fixed, and/or removable storage devices plus storage media for temporarily and/or more permanently containing computer-readable information. The computers and serve permit data to be exchanged with the network 110 and/or any other computer, server, or mobile device.

The computers also comprise various software elements and an operating system and/or other programmable code such as program code implementing a web service connector or components of a web service connector. It should be appreciated that alternate embodiments of a computer may have numerous variations from that described above. For example, customized hardware might also be used and/or particular elements might be implemented in hardware, software (including portable software, such as applets), or both. Further, connection to other computing devices such as network input/output devices may be employed.

It should also be appreciated that the methods described herein may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, ROMs, RAMs, EPROMs, EEPROMs, magnetic or optical cards, flash memory, or other types of machine-readable mediums suitable for storing electronic instructions. Alternatively, the methods may be performed by a combination of hardware and software.

The term "software" as used herein shall be broadly interpreted to include all information processed by a computer processor, a microcontroller, or processed by related computer executed programs communicating with the software. Software therefore includes computer programs, libraries, and related non-executable data, such as online documentation or digital media. Executable code makes up definable parts of the software and is embodied in machine language instructions readable by a corresponding data processor such as a central processing unit of the computer. The software may be written in any known programming language in which a selected programming language is translated to machine language by a compile, interpreter or assembler element of the associated computer.

Figure 6:
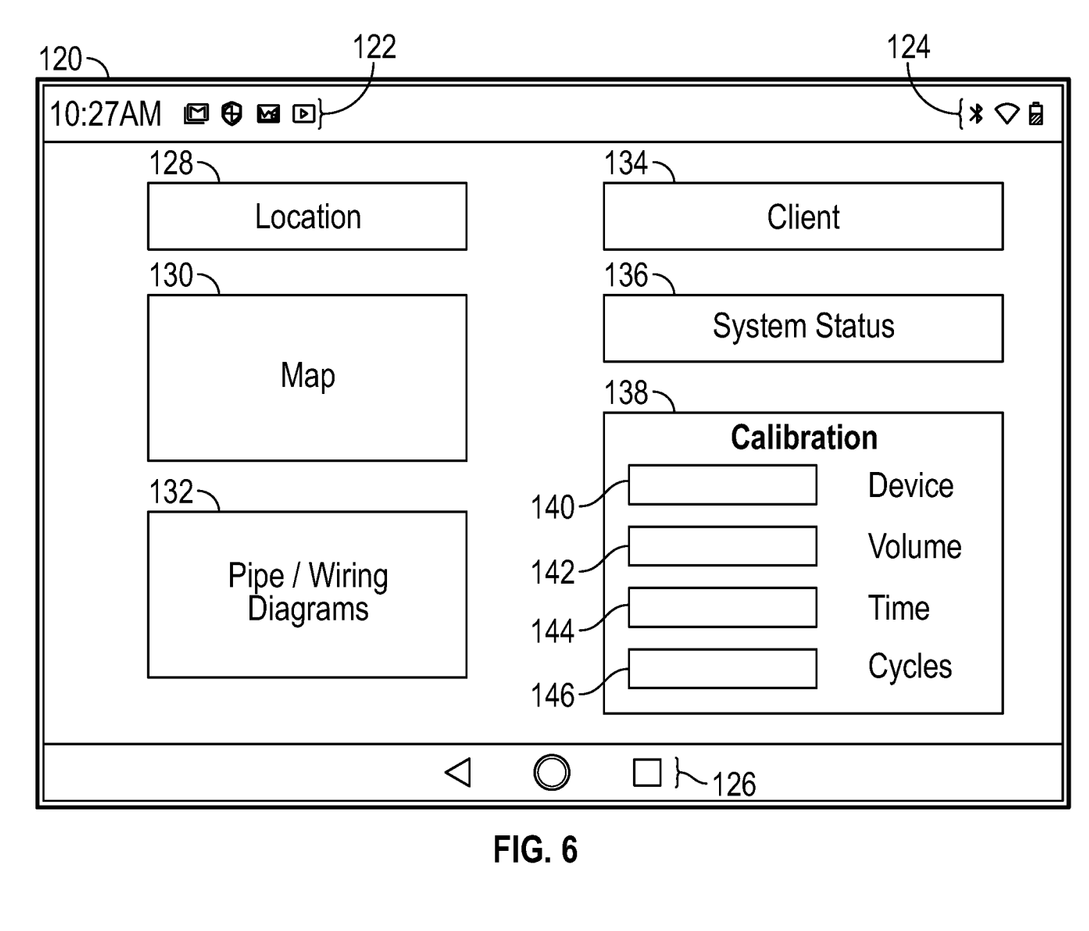
FIG. 6 is a sample user interface showing functionality of the system, the user interface being incorporated within a workstation, client computer, or mobile communication device of the system.
Figure 7:
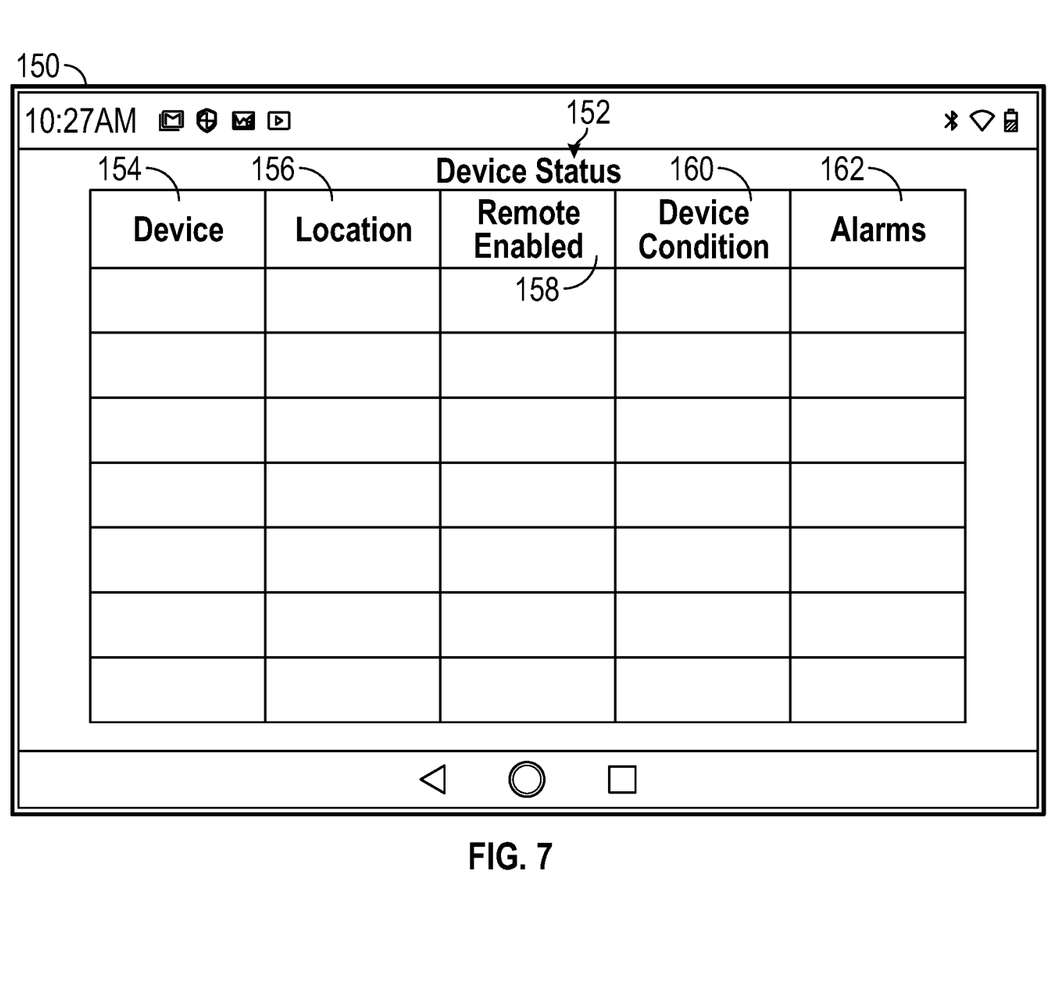
FIG. 7 is another sample user interface showing additional functionality of the system.
Figure 8:
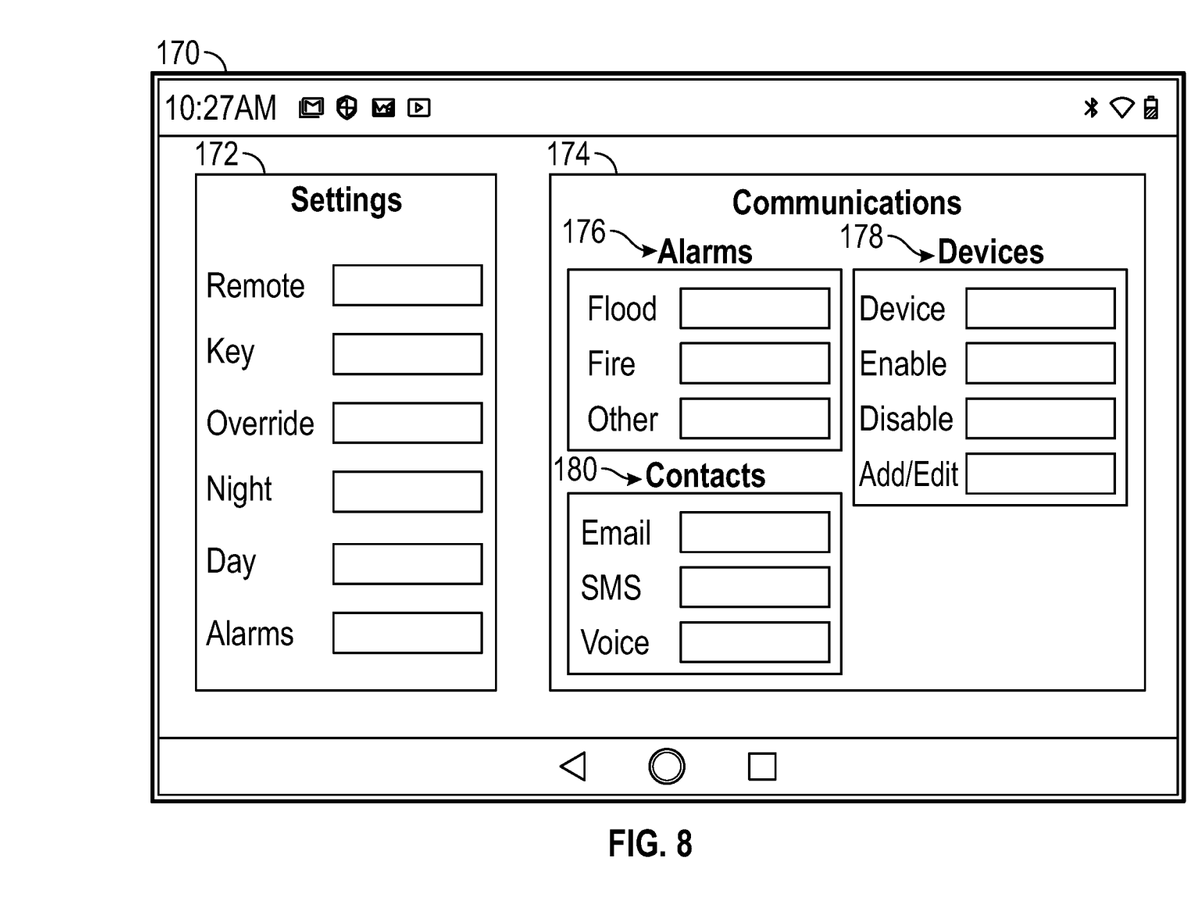
FIG. 8 is another sample user interface showing yet additional functionality of the system.

Considering the foregoing exemplary computer and communications network and elements described herein, it may also be considered a software program or software platform with computer coded instructions that enable execution of the functionality associated with the user interface of FIGS. 6-8 described herein. More specifically, the invention may be considered a software program or software platform that enables monitoring of a building piping system, leak detection, and control of water within the piping system. The software program or platform may further include recommended options for a user that are automatically generated based on predetermined logic associated with the type of leak encountered, where the leak occurred in the building, how much water was leaked, and whether the leak poses any particular problem such as a safety problem associated with the leaking water.

In connection with another embodiment of the invention, it may be considered a combined software and hardware system including (a) a software program or software platform with computer coded instructions that enable execution of the functionality associated with the user interfaces of FIGS. 6-8 along with the execution of one or more algorithms to generate the remediation options in the event of a detected leak.

In connection with yet another embodiment of the invention, it may be considered a sub-combination including one or more user interfaces generated by the software and the detection and control device that provide inputs to a data processor of a computer that runs the software for purposes of generating user options.

FIG. 6 is a sample user interface 120 showing functionality of the device and system of the invention, the user interface 120 being incorporated within a screen display of workstations 102,106, client computer 104, or mobile communication device 50 of the system. The user interface 120 is intended to represent any type of user interface that is viewable on a mobile communication device, a workstation, or other computing device that is in communication with the device 10 to monitor the device and to control device operation. Accordingly, the user interface may include various status indicators, toolbars and browser navigation control buttons. For example, the user interface at the upper margin thereof may include a toolbar 122 providing links to email, a system security status, and others. Also shown is a communication status indicator 124 showing statuses such as a Bluetooth connection, a wireless network connection, and a battery/power status. Also shown at the bottom margin are typical browser navigation control buttons 126.

Although FIG. 6 and the other user interfaces of FIGS. 7 and 8 resemble user interface formats for desktop or laptop computers, again it shall be understood that the information on these user interfaces can be adapted for use on mobile communication devices.

In accordance with a first functional aspect of the user interfaces, the user interface 120 can be considered a general status and set up screen display in which a user may enter the location 128 at which one or more of the devices 10 are installed. A map 130 may be provided as a guide to the specific location of the installed devices to provide the user an overview on the number and location of devices installed within a particular geographic area. Pipe/wiring diagrams 132 may be uploaded and viewable on the interface 120 which may assist users in determining the best location within the building where the device(s) may be installed, along with other pertinent information as to the accessibility of the building considering the current status of construction. The name of the client and other pertinent client information may be entered in box 134. Such client information could include any specific instructions from the client, billing information, and other client related information. The current status of the installed device/system of the invention is viewed in box 136 in which a general indication can be provided as to whether the device/system is operational, is currently being installed, etc. Box 138 indicates calibration statuses and parameters in connection with the fluid pressure monitoring components of the device/system and the volumetric flow measuring components of the device/system. Upon initial startup, it is typical for flowmeters to be calibrated to determine the actual volume of fluid passing as a function of time or the number of cycles recorded. Box 140 shows the current calibration status of a selected device, such as a flowmeter. Box 142 shows a volume parameter, box 144 indicates a time parameter, and box 146 indicates a cycle parameter. Another parameter that could be added is calibration of the pressure measuring component, such as the pressure transducer 20.

FIG. 7 is another sample user interface 150 showing additional functionality of the system, namely, an interface showing the statuses 152 of various installed devices in the field. A convenient table is shown that enables the user to view any device 154 installed within the system, the location of the device 156, whether the device is enabled for remote operation control 158, the condition of the device 160 such as off, running, being installed, being removed, etc. The last column indicates whether there has been an alarm 162. The alarm indication 162 may include a timestamp as to when the alarm(s) occurred, whether the device is currently under an alarm condition, when the alarm(s) was remedied/disabled, and any explanatory notes as to conditions surrounding the alarm(s). The user interface 150 therefore provides a brief but comprehensive status of the devices within the system.

FIG. 8 is yet another sample user interface 170 showing additional functionality of the system. The two major functional features shown in this user interface are system settings 172 and communications 174.

System settings 172 is illustrated as providing data entry and status indicators including remote operation, key/manual operation, override, night operation, day operation, and alarms. Remote operation indicates whether the system is set for control of the device(s) by the workstations 102/106 and/or mobile communication devices 50. Under some circumstances, it may be desirable to not allow remote operation control. The key/manual operation indicates whether operation of the device(s) is enabled for a key that controls the manual switch 40, it again being noted that under some circumstances, it may be desirable to provide only manual control of the system through a manual switch. Override indicates whether there are circumstances under which functioning of any particular device can be overridden by remote or key operation. A circumstance under which this option may be relevant is if there exists a certain alarm condition and it is necessary to be able to transmit the status of that situation through the communications network of the system. Night operation indicates whether there is any time on/off control of the devices; for example, a night setting indicating that one or more of the devices of the system should be set to prevent incoming water flow from the municipal water source. The alarms feature provides a user with options as to when and how alarms could be communicated to the workstations and mobile communication devices.

Communications feature 174 has three further subdivisions, namely, alarms 176 devices 178 and contacts 180. Within alarms 176, this feature enables a user to select conditions under which building alarms should be communicated to communication endpoints, namely the workstations and mobile communication devices. The building alarms could include a detected leak (flood0, a fire alarm, or other alarm such as breach of the building security system.

It is therefore also contemplated that the system of the invention could communicate with a fire alarm system or security system of the building for purposes of transmitting alarm conditions that may occur. Devices 178 is the data entry box in which the devices of the system may be added, edited, or removed. Devices box 178 also provides functionality enabling the user to remotely enable or disable any selected device of the system.

According to one preferred method of the invention, it addresses the need to provide control of building water during two distinct phases of building construction. A first phase of construction, as water flow is controlled by the first mode of operation of the invention, can be generally characterized as when there is a requirement to shut off water to the building at the end of each work period. This phase of the construction occurs when some or all of the piping network of the building is installed, but other significant construction activities are taking place in which the piping network may not have been fully tested, or the piping network could become compromised by construction activities that damage, alter, or otherwise affect the performance of the piping network. The integral timer 42 of each device or a timer within the controller 18 can be used to trigger a command from the controller 18 to shut off incoming water by closing valve 12 during night hours/off hours. Pressure and/or flow of water within the installed piping network however is continually monitored and should be piping develop a leak, a signal is sent to the controller 18 from the pressure transducer 20, flowmeter 22, or both. For example, should the installed piping system develop a leak and a detected pressure drop across the system is 1 psig or greater, the controller 18 will send a signal to open at least the second control valve 14 enabling water to pass to the drain 60. In the event the drain valve 16 is also configured as a control valve, the drain valve 16 is opened by command from the controller 18, enabling water to pass to the drain. Under this scenario, although there is no incoming water flow from the domestic water source, the potential energy of the pressurized water within the piping network is relieved to prevent further leakage and water damage to the building.

A second phase of construction, as water flow is controlled by the second mode of operation of the invention, can be generally characterized as when the domestic water must remain open to ensure that water is provided to all parts of the building that normally carry water. During night or off hours of construction, there should be no water flow through the piping network since the building is not in use. As with the first phase of construction, the system monitors the status of any flow through the system. Should the device measure a flow exceeding a predetermined amount, the controller will again send signals to shut off valve 12 and to open valves 14 and 16 in order to drain the pressurized water within the piping network. For example, should the device measure a flow exceeding 0.025 GPM, valve 12 is closed and water is directed to drain by opening valves 14 and 16. Alternatively, upon detection of a drop in pressure within the piping network, valve 12 is closed and water is directed to drain by opening valves 14 and 16. Timer 42 or a timer integral within the controller 18 may also be used to automatically shut off valve 12 to prevent the flow of incoming water from the domestic water source.

While the invention is described herein with respect to multiple preferred embodiments, it should be understood that the invention is not strictly limited to these embodiments and therefore, the invention in totality should be considered commensurate with the scope of the claims appended hereto.

What is claimed is:

1. A leak detection and control device comprising:
piping for carrying water; a first control valve mounted in said piping for receiving water from a water source;
a second control valve mounted in said piping located downstream from said first control valve and receiving water from said first control valve;
a pressure transducer communicating with said piping to measure water pressure therein; a flowmeter communicating with said piping to measure water flow therein;
a controller to control opening and closing of said first and second control valves, said controller having a processor, a data storage element, and preprogrammed processor instructions for controlling conditions under which said first and second control valves are opened and closed by command from said controller;
said first and second control valves being opened and closed based upon measured changes of pressure and water flow within said piping; and
wherein said preprogrammed processor instructions include a first phase construction mode of operation in which a measured pressure drop in the piping indicates a leak and at least said second control valve is operated to prevent flow into the piping and water in the piping is directed to a drain, said processor instructions further including a second phase construction mode of operation in which the measured pressure drop or a measured amount of flow in the piping indicates the leak and at least said second control valve is operated to prevent flow into the piping and water in the piping is directed to the drain; and
a first user interface showing data associated with said first and second phase construction modes of operation.

2. The leak detection and control device of claim 1, further including:
a carriage to support said device, said carriage including a plurality of frame members, a panel providing mounting space for selected elements of said device including said controller and said pressure transducer, and wheels mounted to said carriage.

3. The leak detection and control device of claim 1, further including:
a switch communicating with said controller for selectively placing the device in a selected mode of operation.

4. A leak detection and control system comprising:
a leak detection and control device comprising piping for carrying water;
a first control valve mounted in said piping for receiving water from a water source;
a second control valve mounted in said piping located downstream from said first control valve and receiving water from said first control valve;
a pressure transducer communicating with said piping to measure water pressure therein;
a flowmeter communicating with said piping to measure water flow therein;
a controller to control opening and closing of said first and second control valves, said controller having a processor, a data storage element, and preprogrammed processor instructions for controlling conditions under which said first and second control valves are opened and closed by command from said controller,
said first and second control valves being operated by instructions received from said processor considering measured changes of pressure and water flow within said piping, and
wherein said processor instructions include a first construction mode of operation in which a measured pressure drop in the piping indicates a leak and at least said second control valve is operated to prevent flow into the piping and water in the piping is directed to a drain, and
wherein said processor instructions include a second construction mode of operation including a normal water-on operation in which the measured pressure drop or a measured amount of flow in the piping indicates the leak and at least said second control valve is operated to prevent flow into the piping and water in the piping is directed to the drain;
a software application communicating with said leak prevention device to receive data, to display data, and to selectively transfer data to one or more remote computing or mobile communication devices, said software application comprising a plurality of user interfaces for displaying data associated with water conditions within said piping, said water conditions including flowrate of the water, pressure of the water and a status of said device responsive to said conditions; and
a first user interface showing data associated with said first and second construction modes of operation.

5. The leak detection and control system of claim 4, further including:
a carriage to support said device, said carriage including a plurality of frame members, a panel providing mounting space for selected elements of said device including said controller and said pressure transducer, and wheels mounted to said carriage.

6. The leak detection and control system of claim 4, further including:
a switch communicating with said controller for selectively placing the device in a selected mode of operation.

7. A mobile leak detection and control device comprising:
a carriage including a plurality of frame members, a panel and piping mounts;
device piping for carrying water and said device piping secured to said frame members by said piping mounts;
a first control valve mounted in said device piping for receiving water from a water source;
a second control valve mounted in said device piping located downstream from said first control valve and receiving water from said first control valve;
a pressure transducer communicating with said device piping to measure water pressure therein;
a flowmeter communicating with said device piping to measure water flow therein;
a controller to control opening and closing of said first and second control valves, said controller having a processor, a data storage element, and preprogrammed processor instructions for controlling conditions under which said first and second control valves are opened and closed by command from said controller;
said first and second control valves being opened and closed based upon measured changes of pressure or water flow within said device piping;
said preprogrammed processor instructions include a first phase construction mode of operation in which a measured pressure drop in the piping indicates a leak and said second control valve is operated to prevent flow into the piping and water in the piping is directed to a drain, said processor instructions further including a second phase construction mode of operation in which the measured pressure drop or a measured amount of flow in the piping indicates the leak and said second control valve is operated to prevent flow into the piping and water in the piping is directed to the drain; and a first user interface showing data associated with said first and second phase construction modes of operation.

8. The mobile leak detection and control device of claim 7 further comprising:

wheels mounted to the carriage for rolling movement of the carriage.

9. A method for leak detection of water within piping and to control water flowing through the piping to prevent water damage in the event of a detected leak, said method comprising:

providing piping for carrying water;

providing a leak detection and control device comprising:
a first control valve mounted in said piping for receiving water from a water source;
a second control valve mounted in said piping located downstream from said first control valve and receiving water from said first control valve;
a pressure transducer communicating with said piping to measure water pressure therein; a flowmeter communicating with said piping to measure water flow therein;
a controller to control opening and closing of said first and second control valves, said controller having a processor, a data storage element, and preprogrammed processor instructions for controlling conditions under which said first and second control valves are opened and closed by command from said controller;

monitoring a status of water in the piping wherein said first and second control valves are opened and closed based upon measured changes of pressure and water flow within said piping;

executing processor instructions of said controller including a first phase construction mode of operation in which a measured pressure drop in the piping indicates a leak and said second control valve is operated to prevent flow into the piping and water in the piping is directed to a drain;

executing processor instructions of said controller including a second phase construction mode of operation in which the measured pressure drop or a measured amount of flow in the piping indicates the leak and said second control valve is operated to prevent flow into the piping and water in the piping is directed to the drain; and providing a first user interface showing data associated with said first and second phase construction modes of operation.

10. The method of claim 9, further including:

providing a carriage to support said device, said carriage including a plurality of frame members, a panel for mounting of selected elements of said device including said controller and said pressure transducer, and wheels mounted to said carriage.

11. The method of claim 9, further including:

providing a switch communicating with said controller for selectively placing the device in a selected mode of operation.

12. The method of claim 10, wherein:

said piping for carrying water is mounted to said carriage, said piping is subsequently connected to existing piping in a building in which leak detection is required when said device is installed in the building for use.

13. The method of claim 12, wherein:

said piping of said device is disconnected from said existing piping in said building and said device with said piping of said device mounted on said carriage is moved to another location for subsequent installation at another location.

\* \* \* \* \*